United States Patent

Diels

[11] Patent Number: 6,039,516

[45] Date of Patent: Mar. 21, 2000

[54] EXTENDING SYSTEM

[76] Inventor: H. Wolfgang Diels, Pfitznesgstrasse 11 80807, München, Germany

[21] Appl. No.: 09/115,065

[22] Filed: Jul. 14, 1998

[30] Foreign Application Priority Data

Jul. 16, 1997 [DE] Germany .................... 197 30 500

[51] Int. Cl.⁷ ................ B23Q 11/08; B23C 9/00; E05D 15/06
[52] U.S. Cl. .................. 409/134; 160/202; 160/223; 451/454; 483/2
[58] Field of Search .................. 483/2; 409/134; 29/DIG. 56, DIG. 101; 160/202, 222, 223; 74/608; 144/251.2; 408/241.6, 710; 451/451, 454

[56] References Cited

U.S. PATENT DOCUMENTS

| | | | |
|---|---|---|---|
| 3,426,830 | 2/1969 | Hascher et al. | 160/202 X |
| 3,429,356 | 2/1969 | Loos et al. | 160/223 |
| 3,565,153 | 2/1971 | Loos et al. | 160/202 |
| 3,658,113 | 4/1972 | Loos et al. | 160/202 |
| 4,039,021 | 8/1977 | Moritz et al. | 74/608 X |
| 5,156,195 | 10/1992 | Weher et al. | 74/608 X |
| 5,570,979 | 11/1996 | Okamoto et al. | 409/134 |
| 5,807,043 | 9/1998 | Blank | 409/134 |
| 5,863,163 | 1/1999 | Wehler et al. | 409/134 |

FOREIGN PATENT DOCUMENTS

| | | | |
|---|---|---|---|
| 2642060 | 3/1978 | Germany | 409/134 |
| 3027443 | 2/1982 | Germany | 160/202 |
| 1495062 | 7/1989 | U.S.S.R. | 409/134 |

*Primary Examiner*—William Briggs
*Attorney, Agent, or Firm*—Thomas, Kayden, Horstemeyer & Risley

[57] ABSTRACT

In order to improve the operational reliability of an extending system with at least four extending elements (10, 20, 30, 40, 50) which are disposed behind one another and can be moved relative to one another in a direction of extension (B) as well as a direction of insertion (A) opposed thereto between an inserted position and an extended position it is proposed that for coupling the motion of the individual extending elements (10, 20, 30, 40, 50) a coupling arrangement be used which has a coupling element (28) which runs round a return spindle (24, 26), wherein the said return spindle is fixed relative to the middle extending element (20) of a group of three extending elements (10, 20, 30) disposed behind one another and extends perpendicular to the direction of extension, and the said coupling element (28) is movable along a path which is fixed relative to the return spindle (24, 25) and runs round the latter, the coupling arrangement also having two entraining elements (12, 31) which on the one hand are coupled to corresponding coupling regions (28a, 28b) on the coupling element (28) and on the other hand are in each case connected to one of the outer extending elements (10, 30) of the group, wherein the coupling element (28) runs at least partially around the return spindle (24, 26) between the coupling regions (28a, 28b).

15 Claims, 5 Drawing Sheets

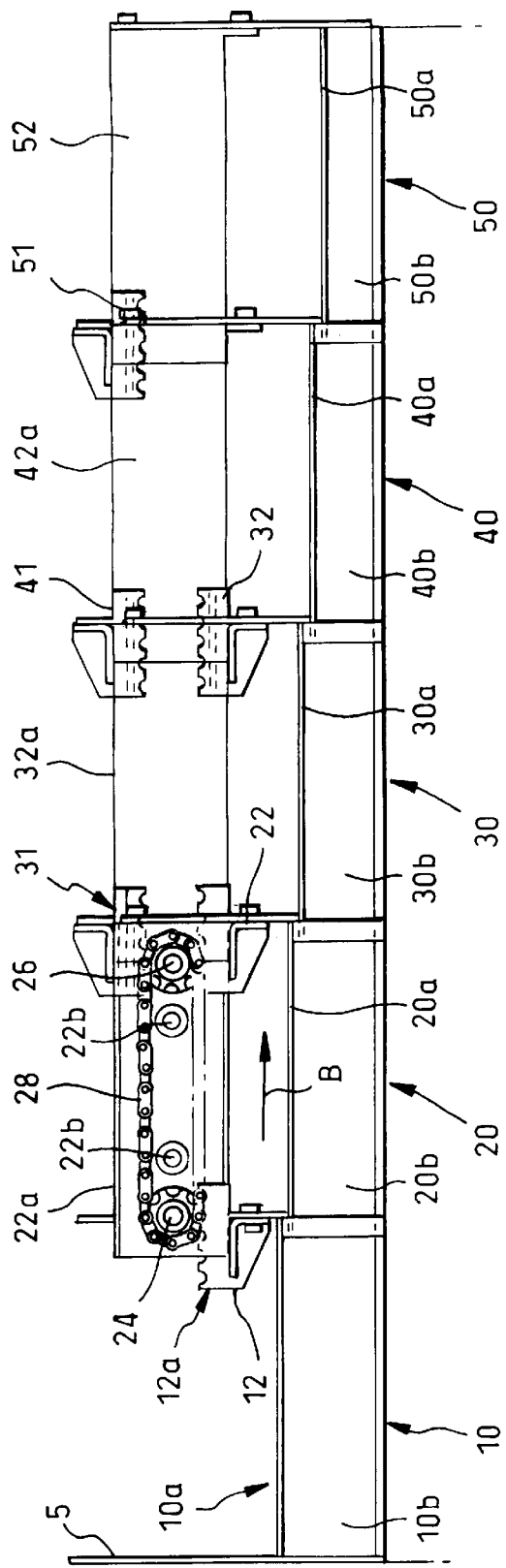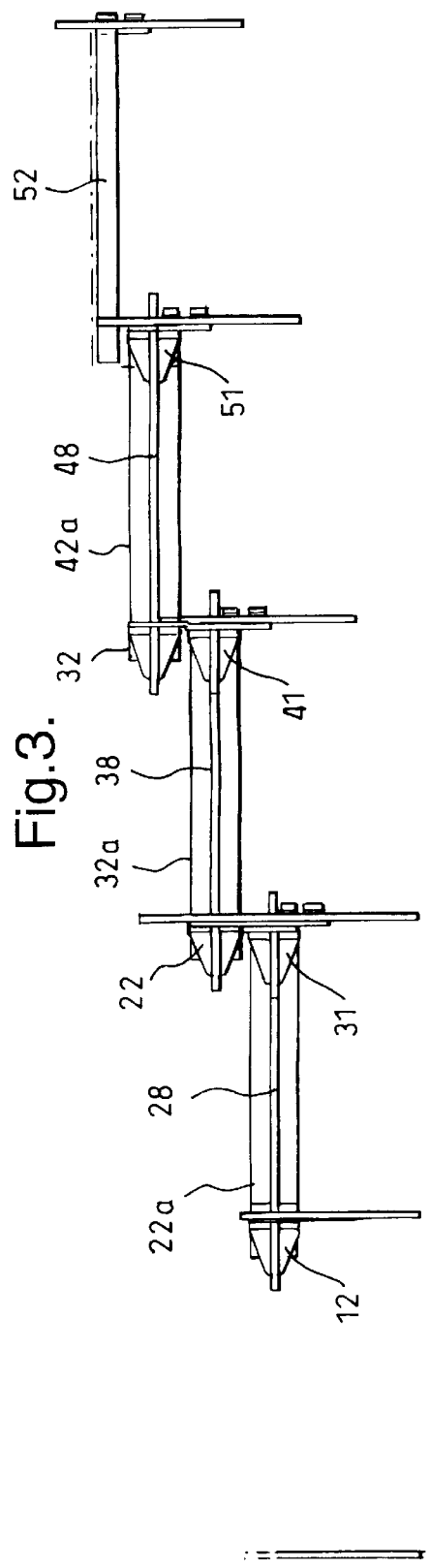

EXTENDING SYSTEM

FIELD OF THE INVENTION

The invention relates to an extending system with at least four extending elements which are disposed behind one another and can be moved relative to one another in a direction of extension as well as a direction of insertion opposed thereto between en inserted position end an extended position, wherein a group of three extending elements disposed immediately behind one another are connected to one another by way of a coupling arrangement which, in the case of a relative movement between two extending elements of the group, brings about a forced relative movement between these two extending elements and the third extending element of the group.

BACKGROUND OF THE INVENTION

Such extending systems are used for example for covering guideways of a machine tool in order to protect them against contamination during operation of the machine tool. An example of known extending systems of the type described in the introduction is shown schematically in FIG. 6 in the form of a telescopic steel cover for a guideway of a machine tool. This system has four extending elements 110, 120, 130 and 140 in the form of cover elements designed to cover a guideway 160 of a machine tool as well as a scissor-like coupling arrangement 150. The cover element 110 is fixed on a frame 105 of the machine tool, whilst the cover element 140 is coupled to a processing tool (not shown) of the machine tool, the said processing tool being capable of travelling along the guideway 160. The coupling arrangement 150 has two coupling rods 152, 152a respectively which are met rotatably on a link pin 112 fixed on the front end of the cover element 110, the said coupling rods being articulated at their ends remote from the link pin 112 by way of hinge joints 153, 153a respectively on coupling rods 154, 154a respectively which are set rotatably on a link pin 122 fixed on the front end of the cover element 120. The coupling rods 154, 154a respectively are articulated at their ends opposite the hinge joints 153, 153a respectively by way of hinge joints 155, 155a on coupling rods 156, 156a respectively which are set rotatably on a link pin 132 fixed on the front end of the cover element 130. Finally, these coupling rods 156, 156a respectively are articulated by way of hinge joints 157, 157a disposed at the ends of the said coupling rods opposite the hinge joints 155, 155a respectively on coupling rods 158, 158a respectively which are set rotatably on a link pin 142 fixed on the front end of the cover element 140.

When the processing tool coupled to the cover element 140 is moved in the direction denoted by the arrow 170 along the runway 160 in order to carry out required processing, the cover element 140 is entrained. As a result the cover is drawn apart out of the inserted position shown in FIG. 6 in which the cover elements 110, 140 respectively are inserted telescopically into one another. In this case the coupling arrangement 150 provides that the extending movement triggered by the movement of the processing tool is uniformly distributed over the extending elements 120, 130 and 140, so that the extension distance of the cover element 140 relative to the cover element 130 in each phase of the extending movement corresponds to that of the cover element 130 relative to the cover element 120 and to that of the cover element 120 relative to the cover element 110. Such a coupling ensures a disruption-free extending movement over all of the available extension length.

Depending upon the dimensions of the cover elements, however, it may be necessary for this purpose to use scissor-like coupling elements of the type shown in FIG. 6, the dimensions of which in a direction extending perpendicular to the direction of extension 170 exceed the dimensions of the cover elements in this direction. Therefore extending systems of the type shown in FIG. 6 cannot be used in confined installation conditions. Furthermore, in the case of an insertion movement out of the extended position reached due to the extending movement in the direction denoted by the arrow 170, considerable forces are exerted on the link pins fixed on the cover elements as well as the link rods and hinge joints of the coupling arrangement 150, which results in severe wear of extending systems of the type shown in FIG. 6.

In view of this problem a telescopic cover of the type shown schematically in FIG. 7 was developed. This telescopic cover has three cover elements 210, 220 and 230 and a coupling arrangement 250. The cover element 210 is fixed on a frame 205 of the machine tool, whilst the cover element 230 can be coupled to a processing tool (not shown) of the machine tool. The coupling arrangement 250 of the arrangement shown in FIG. 7 has a chain 256, which runs round two return spindles 252 and 254 which are fixed relative to the cover element 220 and extend perpendicular to the direction of extension denoted by the arrow 270, as well as two two entraining elements 212 and 232 which are coupled to coupling regions of the chain 256 which are opposite one another. The entraining element 212 is fixed on the cover element 210, whilst the entraining element 232 is fixed on the cover element 230.

In the case of an extending movement of the cover element 230 in the direction denoted by the arrow 270 the entraining element 232 is moved relative to the cover element 220 in the direction denoted by the arrow 257, whilst the entraining element 212 is moved relative to the cover element 220 in the direction denoted by the arrow 258. Because of the fixing of the entraining element 212 on the cover element 210, which for its part is fixed on the machine frame 205, at any time in the extending movement the extension distance of the cover element 230 relative to the cover element 220 corresponds to that of the cover element 220 relative to the cover element 210. In this way it is also possible using the coupling arrangement 250 to ensure a disruption-free extending movement over all of the available extension length. Furthermore, the coupling arrangement 250 hardly takes up any space. Finally, the turning movement of the chain 256 which is required in order to couple the extending elements 210 to 230 can be effected both in the direction of extension denoted by the arrow 270 and in the direction of insertion which is opposed thereto, without significant exertion of force, so that the coupling arrangement 250 is not subject to any significant wear.

However, the coupling arrangement 250 shown in FIG. 7 can only be used For coupling in all of three extending elements. Therefore in the inserted position the length of an extending system provided with such a coupling arrangement amounts to at least a third of the maximum extension length which can be achieved in the extended position. Therefore the extending system shown in FIG. 7 cannot be used when a great extension length and the smallest possible dimensions in the inserted position are required simultaneously. However, even if the dimensions in the inserted position are not subject to any particular restrictions the extending system shown in FIG. 7 can lead to problems in manipulation if a great extension length is required, because then very large extending elements which are difficult to manipulate are required.

In view of the problems just described, extending systems of the type shown schematically in FIG. 8 are used nowadays if great extension lengths and the smallest possible dimensions in the inserted position are required simultaneously. The extending system shown in FIG. 8 in the form of telescopic cover for a guideway 360 of a machine tool comprises four cover elements 310, 320, 330 and 340 which are pushed telescopically into one another in the inserted position shown in FIG. 8. The cover element 310 is fixed on a machine frame 305, whilst the cover element 340 can be coupled to a processing tool or the machine tool and when the latter moves along the guideway 360 the cover element 340 can be entrained thereby. At the rear ends of the cover elements 320, 330 and 340 are disposed entraining elements 322, 332, 342 which cooperate with stop elements 314, 324 and 334 disposed on the front ends of the extending elements 310, 320 and 330.

When the processing tool (not shown) of the machine tool moves in the direction denoted by the arrow 370 the cover element 340 is first of all entrained independently of the cover elements 310, 320 and 330, until the entraining element 342 disposed on the rear end of the cover element 340 strikes the stop element 334 disposed on the front end of the cover element 330 and thus entrains the cover element 330. As the extending movement progresses the entraining element 332 disposed on the rear end of the cover element 330 strikes the stop element 324 disposed on the front end of the cover element 320 and thus entrains the cover element 320. Finally the extending movement is stopped when the entraining element 332 disposed on the rear end of the cover element 320 strikes the stop 314 disposed on the front end of the cover element 310.

With an extending system of the type shown in FIG. 8, even with very great maximum extension lengths, almost any small dimensions can be achieved in the inserted position. However, due to the impacts of the entraining elements 342 and 332 on the stop elements 334 and 324 respectively, such strong vibrations are generally exerted on the processing tool coupled to the cover element 340 that marked impairments of the processing quality can occur at the corresponding locations of the workpiece processed with the processing tool. In order to eliminate these shortcomings it has already been proposed that the entraining elements or stop elements of extending systems of the type shown in FIG. 8 be provided with damping elements. With these damping elements the vibrations triggered by the impacts can still be adequately damped at rates of extension of up to 40 m per minute. However, with modern machine tools travelling speeds of the processing tool during processing of 100 m per minute or more can be reached. Therefore the maximum processing speed which can be achieved without impairing the processing quality is limited by the maximum rate of extension of the extending systems required to cover the guideway of the machine whilst ensuring sufficient vibration damping.

SUMMARY OF THE INVENTION

In view of this problem in the prior art, the object of the invention is to make available a low-wear extending system which keeps to small dimensions in the inserted position and a great maximum extension length and permits a vibration-free extending movement over the longest possible extension distance.

This object is achieved by an extending system with at least four extending elements of the type explained in the introduction which are disposed behind one another, this system being essentially characterised in that the coupling arrangement has a coupling element which runs round a return spindle, the said return spindle being fixed relative to the middle extending element of the group and extending perpendicular to the direction of extension, and the said coupling element is movable along a path which is fixed relative to the return spindle and runs round the latter, the coupling arrangement also having two entraining elements which on the one hand are coupled to corresponding coupling regions on the coupling element and on the other hand are in each case connected to one of the outer extending elements of the group, wherein the coupling element runs at least partially around the return spindle between the coupling regions.

By the use of at least four extending elements disposed behind one another and extension length of basically any magnitude can be achieved with the extending system according to the invention whilst ensuring small dimensions in the inserted position. This extension length can be achieved by an extending movement which progresses without vibration at least during the phase in which the three extending elements connected to one another by the coupling arrangement are moved relative to one another. As a result vibration-free processing can be achieved along a working section which corresponds to the sum of the maximum extension distance of one outer extending element of the group relative to the middle extending element and the maximum extension distance of the middle extending element relative to the other outer extending element of the group. The arrangement of the coupling regions according to the invention ensures that the extending movement along this processing section takes place by a simultaneous movement of the two outer extending elements relative to the middle extending element of the group, thus ensuring the freedom from vibration of the extending movement along the processing section. The coupling arrangement used for this purpose comprises only three elements, namely the coupling element and the two entraining elements, which can be of extremely compact construction. Therefore in the inserted position too the dimensions of the extending system according to the invention are determined almost exclusively by the dimensions of the extending elements. Finally, the coupling of motion with the coupling arrangement of the extending system according to the invention is achieved by way of a turning movement of the coupling element which can be effected in each phase of the extending and insertion movement without significant exertion or force. Therefore the coupling arrangement of the extending system according to the invention proves to be extremely wear-resistant and to have a long life.

Lengthening of the extension distance along which the extending system according to the invention makes a vibration-free extending movement possible can be achieved if the coupling arrangement has a second coupling element which runs round a second return spindle, the said return spindle being fixed relative to one of the outer extending elements of the group and extending perpendicular to the direction of extension, and the said second coupling element is movable along a path which is fixed relative to the second return spindle and runs round the latter, the coupling arrangement also having two entraining elements which are coupled to corresponding coupling regions on the second coupling element and of which one is connected to the middle extending element of the group and the other to a fourth extending element disposed immediately behind the group, wherein the second coupling element runs at least partially around the second return spindle between the coupling regions.

With this arrangement the length of the extension distance along which a vibration-free extending movement can be achieved is lengthened by the maximum extension distance of the fourth extending element relative to one of the outer extending elements of the group, because by the use of the second coupling element and the entraining elements coupled thereto simultaneous extending movement of the fourth extending element relative to one of the outer extending elements of the group is ensured for movement of the two outer extending elements of the group relative to the middle extending element. This simultaneous movement of the fourth extending element can likewise be effected in each phase of the insertion or extending movement without significant exertion of force, because the coupling used therefor according to the invention is likewise achieved by a turning movement of the second coupling element. Furthermore, the second coupling element and the entraining elements coupled thereto can also be of very compact construction, so that installation thereof does not cause any significant in crease in the overall dimensions of the extending system.

Whilst ensuring the advantages Just described, the extending system according to the invention makes possible a completely vibration-free extending movement if each of the extending elements disposed between the first and the last extending element of the system has associated with it a coupling element which runs round a return spindle, the said return spindle being fixed relative to the corresponding extending element and extending perpendicular to the direction of extension, and the said coupling element is movable along a path which is fixed relative to the said return spindle and runs round the latter, wherein on each coupling element at corresponding coupling regions there are coupled two entraining elements, of which one is connected to the extending element disposed immediately before the corresponding extending element and the other is connected to the extending element disposed immediately behind it, and the coupling element at least partially runs round the particular return spindle between the coupling regions.

With the extending system according to the invention, in each phase of the extending or insertion movement two extending elements which are connected by way of a coupling element and the entraining elements coupled thereto cover the same extending distance relative to the extending element disposed therebetween in opposing directions when the coupling element runs round the corresponding return spindle between the coupling regions by 180°.

The coupling elements of the extending system according to the invention can be constructed for example in the form of toothed wheels which are rotatable about the corresponding return spindle and to which are coupled entraining elements in the form of toothed racks which engage with the toothed wheels. With this construction of the coupling elements, however, the Individual coupling regions are very small, which leads to a corresponding concentration of the forces occurring during the extending or insertion movement and consequently leads to high wear. Therefore it is particularly advantageous if at least one of the coupling elements runs round two parallel return spindles which are fixed relative to the corresponding extending element and between which the coupling element has two straight sections which extend parallel to one another and each include a coupling region. By the use of such coupling elements the coupling regions can be disposed over a comparatively great length along the straight sections of the coupling element, which leads to a corresponding distribution of the forces occurring during the extending or insertion movement and thus to an increased wear resistance.

With a predetermined maximum extension distance between two extending elements which are coupled to a corresponding coupling element by way of corresponding entraining elements, the coupling element can be of particularly compact construction if the coupling regions are disposed in mirror symmetry relative to a point which bisects this distance between the two return spindles.

The coupling of motion between the coupling element and the the entraining elements can be stabilised by guiding the entraining elements in guides which extend parallel to the straight sections of the coupling element. Further stabilisation is achieved if at least one support element, such as for instance a support roller, is disposed between the straight sections.

If the extending system according to the invention is used for covering a guideway of a machine tool it is particularly advantageous if the extending elements at least partially overlap both in the inserted position and in the extended position, because in this way complete covering of the guideway is ensured.

BRIEF DESCRIPTION OF THE DRAWINGS

The invention is explained below with reference to the drawings, to which express reference is made with regard to all details which are essential to the invention and are not set out in greater detail in the description. In the drawings:

FIG. 2 shows a side view of an embodiment of an extending system according to the invention in the form of a telescopic steel cover, FIG. 3 shows a plan view of the telescopic steel cover shown in FIG. 2.

DETAILED DESCRIPTION

Figure 1:
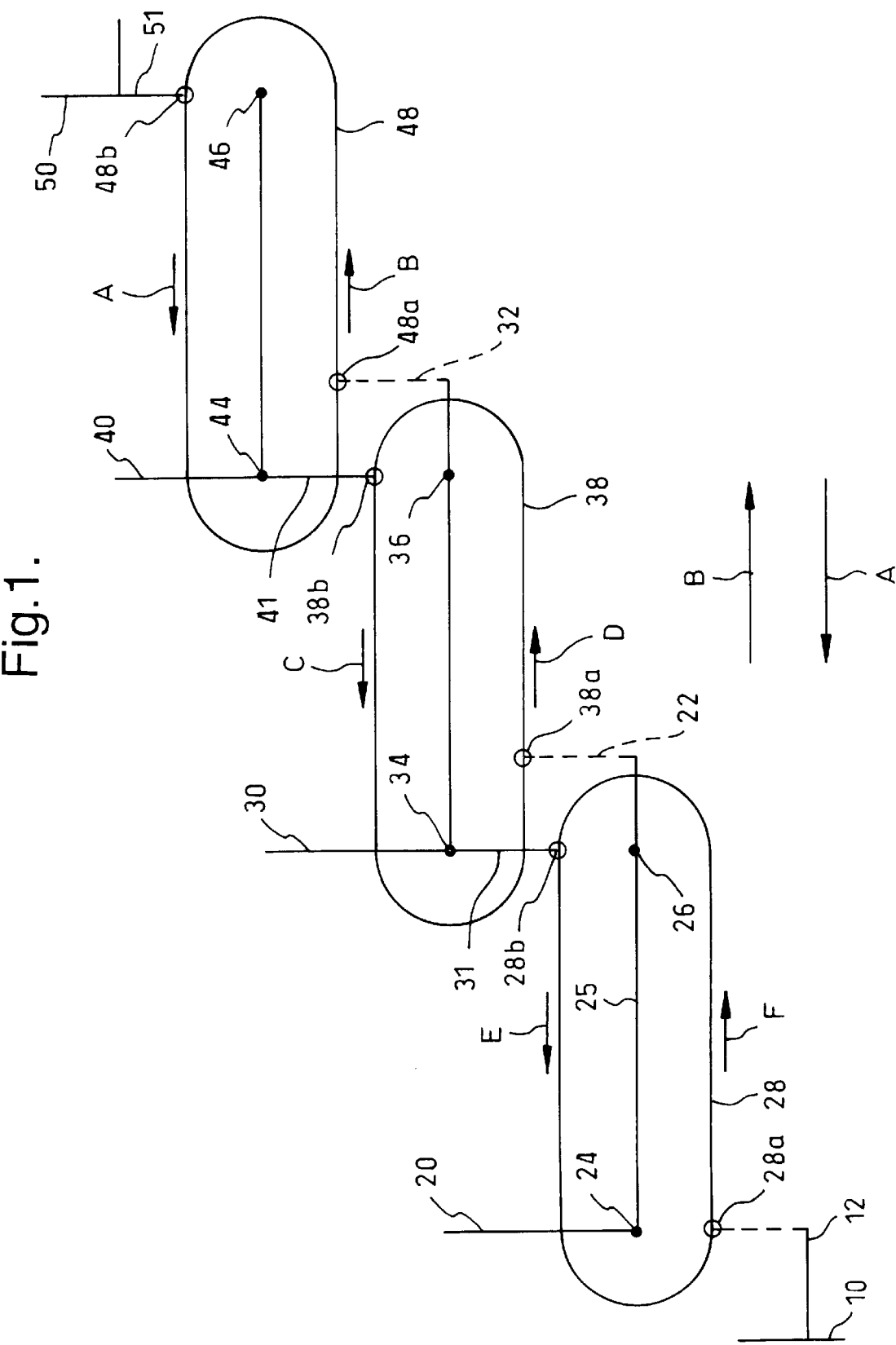
FIG. 1 shows a schematic representation of an extending system according to the invention.
Figure 4:
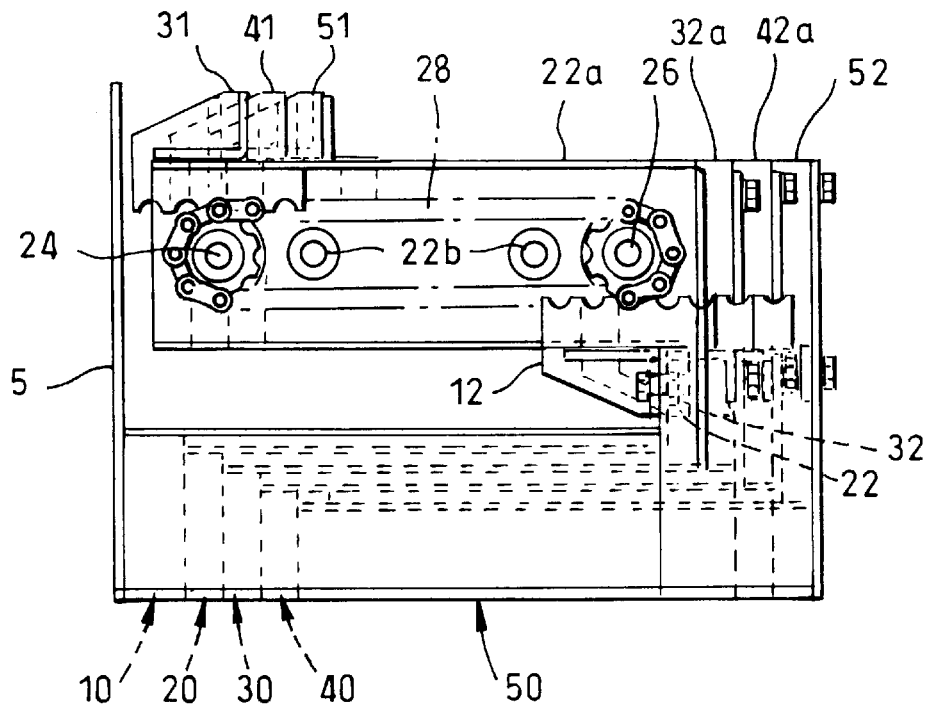
FIG. 4 shows a side view of the telescopic steel cover shown in FIG. 2 in an inserted position.

The extending system shown in FIG. 1 in an extended position has a total of five extending elements 10, 20, 30, 40 and 50 which are disposed behind one another and are movable relative to one another in a direction of extension denoted by the arrows B and a direction of insertion opposed thereto end denoted by the arrows A between an inserted position and an extended position. For coupling of the motion of the individual extending elements the extending system is also provided with a total of three continuously turning coupling chains 28, 38 and 48. The first coupling chain 28 runs round two return spindles, which are fixed relative to the extending element 20 and extend perpendicular to the direction of extension B, and is movable along a fixed path running round these return spindles. The extending element 10 disposed immediately before the extending element 20 is coupled by way of an entraining element 12 rigidly connected thereto to a lower run of the coupling chain 28. The corresponding coupling region 28a of the coupling chain 28 is disposed at the rear end of the lower run of the coupling chain 28 in the extended position shown in FIG. 1. The extending element 30 disposed immediately behind the extending element 20 is coupled by way of an entraining element 31 rigidly connected thereto to the upper run of the coupling chain 28. The corresponding coupling region 28b is disposed at the front end of the upper run of the coupling chain 28 in the illustrated extended position.

The second coupling chain 38 runs round two return spindles 34 and 36 which are fixed relative to the extending element 30 end extend perpendicular to the direction of extension B, end this coupling chain is also movable along a fixed path running round these return spindles. The second extending element 20 is coupled by way of an entraining element 22 rigidly connected thereto to the coupling chain 38 on a coupling region 38a which is disposed at the rear end of the lower run of the coupling chain 38 in the illustrated extended position. The fourth extending element 40 is coupled by way of an entraining element 41 rigidly connected thereto to the upper run of the coupling chain 38 on a coupling region 38b disposed at the front end of the coupling chain 38.

The third coupling chain 48 runs round two return spindles 44 and 46 which are fixed relative to the fourth extending element 40 and extend perpendicular to the direction of extension, and this coupling chain is also movable along a fixed path running round these return spindles. The third extending element 30 is coupled by way of an entraining element 32 rigidly connected thereto to the coupling chain 48 on a coupling region 48a which is disposed at the rear end of the lower run or the coupling chain 48 in the illustrated extended position. The fifth extending element 50 is coupled by way of an entraining element 51 rigidly connected thereto to the upper run of the coupling chain 48 on a coupling region 48b disposed at the front end of the coupling chain 48.

The couplings between the individual entraining elements and the coupling chains are so designed that the entraining elements are entrained during a movement of the coupling chain or themselves entrain the coupling chain during their own movement.

When the fifth extending element 50 is moved in the direction of the arrow A relative to the fourth extending element 40 in order to change the extending system from the extended position shown in FIG. 1 to the inserted position, there is a transmission of this insertion movement by way of the coupling chain 48 and the entraining element 32 to the third extending element 30 which is rigidly connected thereto and which is moved thereby in the direction of the arrow B relative to the fourth extending element 40. Due to this relative movement of the third extending element 30 relative to the fourth extending element 40, by way of the entraining element 41 which is rigidly connected to the fourth extending element 40, the coupling chain 38 and the entraining element 22 a relative movement of the extending element 20, which is rigidly connected to the latter, with respect to the third extending element is caused in the direction denoted by the arrow D. Finally, the relative movement of the second extending element 20 with respect to the third extending element 30 in the direction denoted by the arrow D causes, by way of the entraining element 31 which is rigidly connected to the third extending element 30, the coupling chain 28 and the entraining element 12, a relative movement of the first extending element 10, which is rigidly connected to the latter, with respect to the second extending element 20 in the direction denoted by the arrow F.

Thus overall the movement of the fifth extending element 50 relative to the fourth extending element 40 is converted into a relative movement between all neighbouring extending elements. If the first extending element 10 for example is fixed on a machine frame, the result of this coupling is that an insertion movement of the fifth extending element 50 at a predetermined rate in the direction denoted by the arrow A brings about an insertion movement of the fourth extending element 40 in the insertion direction denoted by the arrow A at half the predetermined rate, an insertion movement of the third extending element 30 in the direction denoted by the arrow A at a quarter of the predetermined rate and an insertion movement of the second extending element 20 in the direction denoted by the arrow A at an eighth of the predetermined rate. In this way all the extending elements are simultaneously moved during the insertion process. In a similar manner, in the case of an extending movement of the extending elements out of the inserted position in the direction denoted by the arrow B relative to the extending element 10 which is fixed on the machine frame, the extending elements 20, 30, 40 and 50 are simultaneously moved, the relative movement between all extending elements immediately adjacent to one another being the same.

For the sake of completeness it is pointed out that the coupling regions 28a and 28b of the coupling chain 28 are disposed in mirror symmetry relative to a point 25 which bisects the distance between the return spindles 24 and 26, so that the length of the straight sections or the coupling chain 28 can be completely utilised during the insertion of extending operation.

The extending system shown in FIGS. 2 to 5 in the form of a telescopic steel cover for a guideway of a machine tool essentially corresponds as regards its function to the extending system explained with reference to FIG. 1. Therefore the same reference numerals are used in FIGS. 2 to 5 for components which correspond to components explained with reference to FIG. 1.

The illustrated telescopic steel cover comprises in all five cover elements 10, 20, 30, 40 and 50 which overlap one another and of which each has a top wall 10a, 20a, 30a, 40a and 50a respectively and two side walls 10b, 20b, 30b, 40b and 50b respectively projecting therefrom and extending perpendicular thereto. The cover element 10 is fixed on a machine frame 5. A coupling chain 28 is disposed above the cover element 20 and in a chain housing 22a which is rigidly connected to the cover element 20 this coupling chain runs round two toothed wheels 24 and 26 which are mounted in the chain housing and are rotatable about two parallel spindles which are fixed relative to the cover element 20 and extend perpendicular to the direction of extension the telescopic steel cover denoted by the arrow B. The lower run of the coupling chain 28 engages with a region 12a, which is like a toothed rack and extends in the direction of extension B, of an entraining element 12 fixed on the front end of the cover element 10. In the extended position of the telescopic steel cover shown in FIGS. 2 and 3, the front end of the upper run of the coupling chain 28 engages in a region, which is also like a toothed rack, of an entraining element 31 which is rigidly fixed on the front end of the cover element 30 by way of a chain housing 32a.

The chain housing 32a contains, in a similar fashion to the chain housing 22a, a coupling chain 38 (cf. FIG. 3) which in a similar fashion to the coupling chain 28 runs round two toothed wheels (not shown) mounted rotatably in the chain housing 32a. The rear end of the lower run of the coupling chain 38 engages with a region, in the form of a toothed rack, of a retaining element 22 fixed on the front end of the cover element 20, whilst in the extended position shown in FIGS. 2 and 3 the front end of the upper run of the coupling chain 38 engages with a region, in the form of a toothed rack, of an entraining element 41 fixed on the front end of the cover element 40 by way of a chain housing 42a.

In the chain housing 42a is installed a coupling chain 48 (cf. FIG. 3) which in a similar fashion to the coupling chain 28 runs round two toothed wheels (not shown) mounted rotatably in the chain housing. In the extended position shown in FIGS. 2 and 3 the rear end of the lower run of the coupling chain 48 engages with a region, in the form of a toothed rack, of a retaining element 32 fixed on the front end of the cover element 30, whilst the front end of the upper run of the coupling chain 48 engages with a region, in the form of a toothed rack, of an entraining element 51 fixed on the front end of the cover element 50 by way of a holder 52.

As can be seen particularly clearly from FIG. 3, the individual coupling chains 28, 38 and 48 are disposed so that they are offset laterally with respect to one another at equal intervals perpendicular to the direction of extension B, wherein the entraining element 22 fixed on the cover element 20 is disposed laterally adjacent to the chain housing 22a and is aligned with a slot provided in a lower well of the chain housing 32a. In a similar manner the entraining elements 31 and 32 fixed on the cover element 30 are disposed on opposite sides adjacent to the chain housing 32a and are aligned on the one hand with a slot extending in the direction of extension in an upper wall of the chain housing 22a and on the other hand with a lower slot extending in the direction of extension B in the lower wall of the chain housing 42a. The entraining element 51 which is fixed on the cover element 50 by the holder 52 is aligned with a slot extending in the direction of extension B in the upper wall of the chain housing 42a, whilst the entraining element 12 fixed on the front end of the cover element 10 is aligned with a slot extending in the direction of extension B in the lower wall of the chain housing 22a.

This arrangement facilitates a form-locking coupling of the individual entraining elements on the coupling chains, by which the relative movement between the individual extending elements is not hindered. Due to this movement, and by utilising the forced coupling explained with reference to FIG. 1, the cover elements 10 to 50 can be moved unhindered out of the extended position shown in FIGS. 2 and 3 into the inserted position shown in FIG. 4, in which the entraining elements 31, 41 and 51 or 12, 22 and 32 respectively are disposed adjacent to one another and the entire length in the direction of extension B is less than a third of the total length in the extended position.

Figure 5:
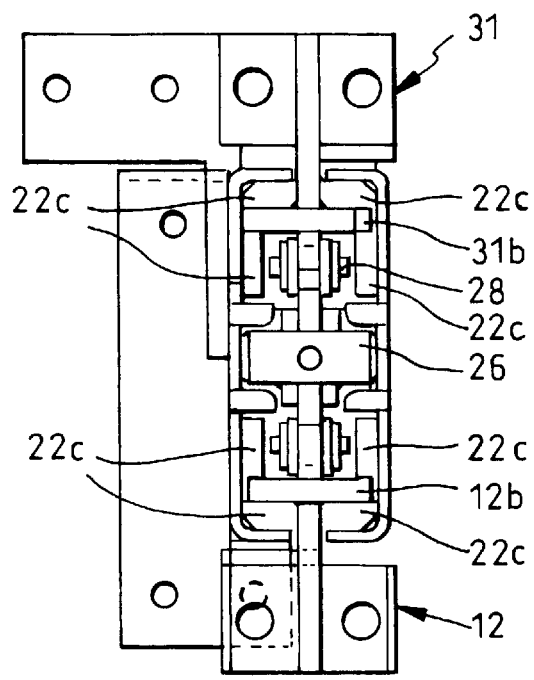
FIG. 5 shows a sectional representation of a coupling element with two entraining elements coupled thereto of the telescopic steel cover shown in FIG. 2.
Figure 6:
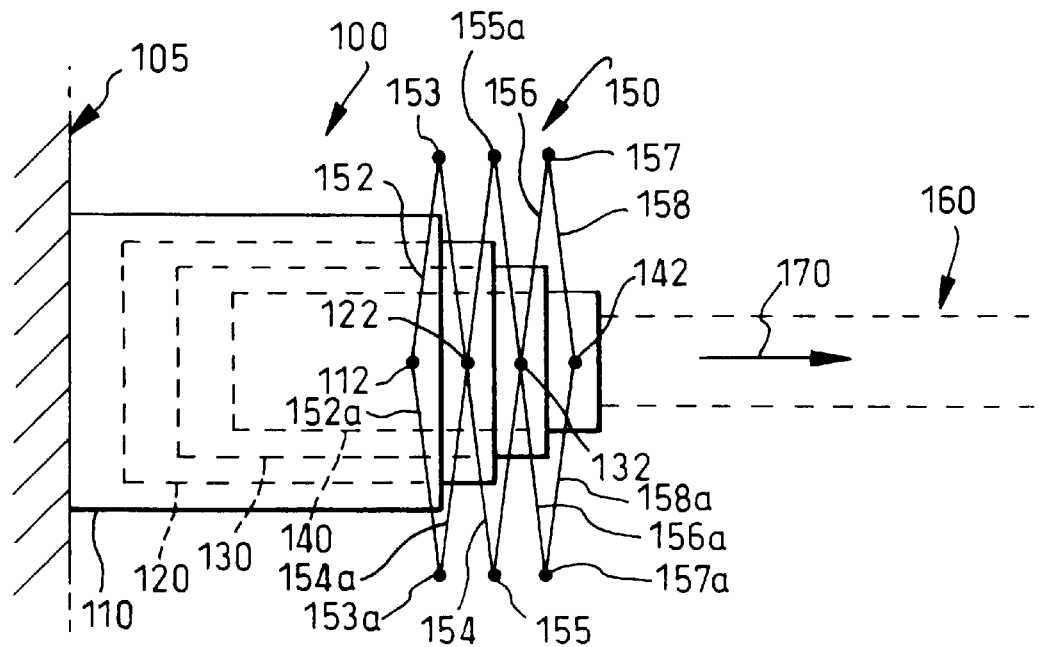
FIG. 6 shows a first extending system according to the prior art.
Figure 7:
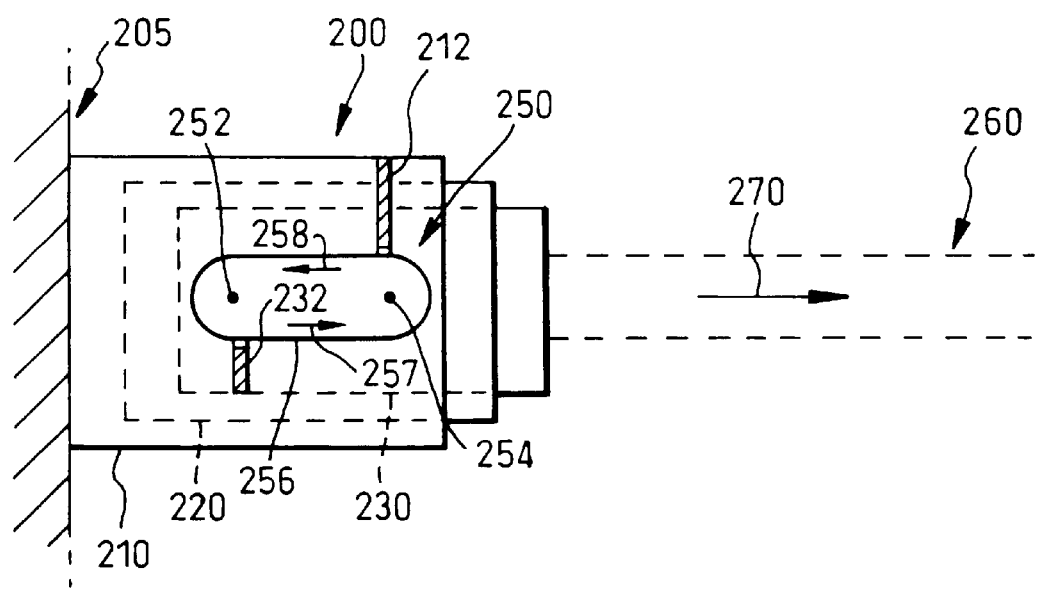
FIG. 7 shows a second extending system according to the prior art.
Figure 8:
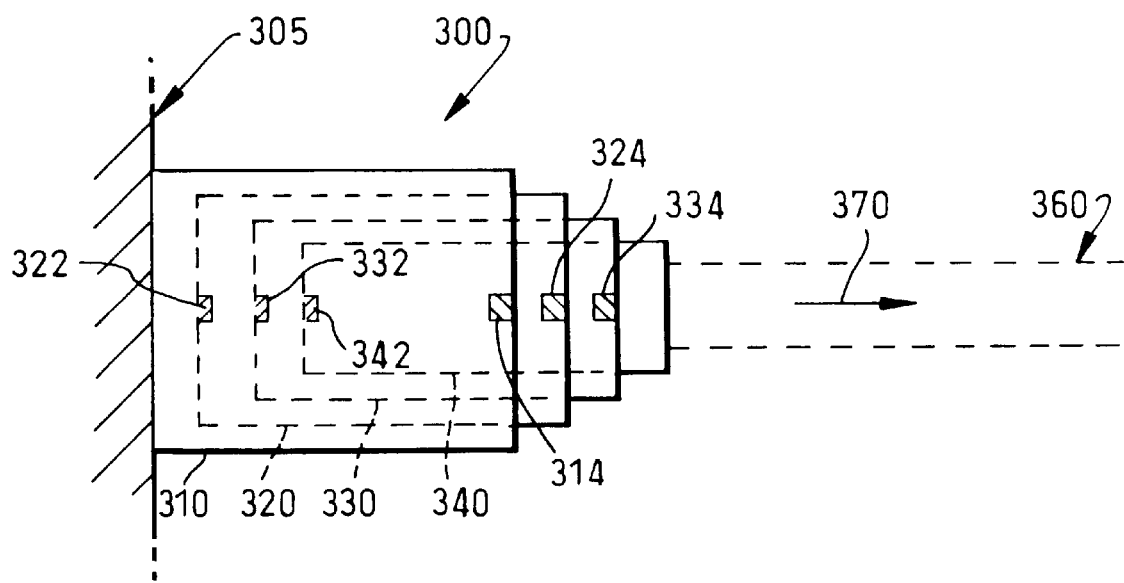
FIG. 8 shows a third extending system according to the prior art.

As can be seen particularly clearly from FIG. 5, the entraining elements 12 and 31, like the other entraining elements of the telescopic steel cover which pass through corresponding slots in the upper or lower wall of the chain housing 22b. have transverse elements 31b or 12b respectively within the chain housing 22a. These transverse elements 31b and 12b are guided in guides which extend in the direction of extension B and are formed by guide elements 22c fixed on the inner wall of the chain housing 22a. In this way a stable guiding of the entraining elements along the coupling chain can be achieved. A further stabilisation of the guiding is achieved by support rollers 22b disposed between the runs of the coupling chain.

The invention is not limited to the embodiment explained with reference to the drawings. For example, an extending system according to the invention may have more than five extending elements. Instead of the coupling chains it is also possible to use coupling belts or toothed wheels which are coupled to entraining elements in the form of clips or toothed racks. Naturally it is also possible to dispose the coupling elements and entraining elements under the top walls between the side walls of the cover elements. The coupling chains, coupling belts or the like can run round return spindles which extend approximately perpendicular. Finally, with the extending system according to the invention it Is also possible to produce telescopic steel covers for guideways which are curved in a circular line.

I claim:

1. Extending system with at least four extending elements (10, 20, 30, 40, 50) which are disposed behind one another and can be moved relative to one another in a direction of extension (B) as well as a direction of insertion (A) opposed thereto between an inserted position and an extended position, wherein a group of three extending elements (10, 20, 30) disposed immediately behind one another are connected to one another by way of a coupling arrangement (12, 28, 31) which, upon relative movement between two extending elements (20, 30) of the group, brings about a forced relative movement between these two extending elements (20, 30) and the third extending element (10) of the group, characterized in that the coupling arrangement has a coupling element (28) which runs round a return spindle (24, 26), the said return spindle being fixed relative to the middle extending element (20) of the group and extending perpendicular to the direction of extension, and the said coupling element (28) is movable along a path which is fixed relative to the return spindle (24, 26) and runs round the latter, the coupling arrangement also having two entraining elements (12, 31) which are coupled to corresponding coupling regions (28a, 28b) on the coupling element (28) and are connected to one of the outer extending elements (10, 30) of the group, wherein the coupling element (28) runs at least partially around the return spindle (24, 26) between the coupling regions (28a, 28b).

2. Extending system as claimed in claim 1, characterised in that the coupling arrangement has a second coupling element (38) which runs round a second return spindle (34, 36), the said return spindle being fixed relative to one of the outer extending elements (30) of the group and extending perpendicular to the direction of extension (B), and the said second coupling element is movable along a path which is fixed relative to the second return spindle (34, 36) and runs round the latter, the coupling arrangement also having two entraining elements (22, 41) which are coupled to corresponding coupling regions (38a, 38b) on the second coupling element (38) and of which one is connected to the middle extending element (20) of the group and the other to a fourth extending element (40), wherein the second coupling element (38) runs at least partially around the second return spindle (34, 36) between the coupling regions (38a, 38b).

3. Extending system as claimed in claim 2, characterised in that each of the extending elements (20, 30, 40) disposed between the first (10) and the last extending element (50) of the system has associated with it a coupling element (28, 38, 48) which runs round a return spindle (24, 26, 34, 36, 44, 46), the said return spindle being fixed relative to the corresponding extending element (20, 30, 40) and extending perpendicular to the direction of extension, and the said coupling element is movable along a path which is fixed relative to the said return spindle (24, 26, 34, 36, 44, 46) and runs round the latter, wherein on each coupling element (28, 38, 48) at corresponding coupling regions (28a, 28b, 38a, 38b, 48a, 48b) there are coupled two entraining elements (12, 22, 31, 32, 41, 51), of which one is connected to the extending element (10, 20, 30) disposed immediately before the corresponding extending element (20, 30, 40) and the other is connected to the extending element (30, 40, 50) disposed immediately behind it, and the coupling element (28, 38, 48) at least partially runs round the particular return spindle (24, 26, 34, 36, 44, 46) between the coupling regions (28*a,* 28*b,* 38*a,* 38*b,* 48*a,* 48*b*).

4. Extending system as claimed in claim 1, characterised in that at least one of the coupling elements (28, 38, 48) runs round the corresponding return spindle (24, 25, 34, 36, 44, 46) between the coupling regions (28*a,* 28*b,* 38*a,* 38*b,* 48*a,* 48*b*) by 180°.

5. Extending system as claimed in claim 4, characterised in that at least one of the coupling elements (28, 38, 48) runs round two parallel return spindles (24, 26, 34, 36, 44, 46) between which it has two straight sections which extend parallel to one another and each include a coupling region (28*a,* 28*b,* 38*a,* 38*b,* 48*a,* 48*b*).

6. Extending system as claimed in claim 5, characterised in that the coupling regions (28*a,* 28*b*) are disposed in mirror symmetry relative to a point (25) which bisects the distance between the two return spindles (24, 26).

7. Extending system as claimed in claim 5, characterised in that the entraining elements (12, 22, 31, 32, 41, 51) are guided in guides which extend parallel to the straight sections.

8. Extending system as claimed in claim 5, characterized in that at least one support element is disposed between the straight sections.

9. Extending system as claimed in claim 1, characterized in that at least one of the coupling elements (28, 38, 48) is a steel chain.

10. Extending system as claimed in claim 9, characterized in that at least one of the entraining elements (12, 22, 31, 32, 41, 51) coupled to the steel chain (28, 38, 48) has a toothed rack (12*a*) which extends parallel to the direction of extension and engages in the steel chain (28, 38, 48).

11. Extending system as claimed claim 1, characterised in that the extending elements (10, 20, 30, 40, 50) at least partially overlap in the inserted position.

12. Extending system as claimed in claim 11, characterised in that the extending elements (to, 20, 30, 40, 50) at least partially overlap in the extended position.

13. Extending system as claimed in claim 11, characterised in that the extending elements are cover elements of a telescopic steel cover for protecting a guideway of a machine tool.

14. Use of an extending system as claimed in claim 13 as a telescopic steel cover for a guideway of a machine tool.

15. Machine tool with a telescopic cover as claimed in claim 13 for a guideway of a movable machine part.

* * * * *